(12) United States Patent
Mettu et al.

(10) Patent No.: US 10,751,742 B2
(45) Date of Patent: Aug. 25, 2020

(54) SYSTEM AND METHOD FOR PAINTING AN INTERIOR WALL OF HOUSING USING A SEMI-AUTOMATIC PAINTING ROBOT

(71) Applicant: ENDLESS ROBOTICS PRIVATE LIMITED, Hyderabad (IN)

(72) Inventors: Sai Srikar Reddy Mettu, Hyderabad (IN); Puneeth Bandikatla, Hyderabad (IN); Nitesh Boyina, Hyderabad (IN); Ravi Teja Yaramaneni, Hyderabad (IN); Akhil Varma Nallaparaju, West Godavari District (IN); Pradeep Maripi, Hyderabad (IN)

( * ) Notice: Subject to any disclaimer, the term of this patent is extended or adjusted under 35 U.S.C. 154(b) by 178 days.

(21) Appl. No.: 16/065,820

(22) PCT Filed: Feb. 25, 2017

(86) PCT No.: PCT/IN2017/050075
§ 371 (c)(1),
(2) Date: Jun. 25, 2018

(87) PCT Pub. No.: WO2017/145183
PCT Pub. Date: Aug. 31, 2017

(65) Prior Publication Data
US 2018/0369846 A1    Dec. 27, 2018

(30) Foreign Application Priority Data

Feb. 27, 2016  (IN) .............................. 201641006851

(51) Int. Cl.
*B05B 13/04* (2006.01)
*B05B 13/00* (2006.01)
(Continued)

(52) U.S. Cl.
CPC .............. *B05B 12/12* (2013.01); *B05B 12/00* (2013.01); *B05B 12/04* (2013.01); *B05B 13/005* (2013.01);
(Continued)

(58) Field of Classification Search
CPC .......... B05B 13/04; B05B 13/00; B05B 12/04
See application file for complete search history.

(56) References Cited

U.S. PATENT DOCUMENTS

2015/0274294 A1* 10/2015 Dahlstrom ............ B05B 9/0403
239/722
2016/0368022 A1* 12/2016 Ohta ........................ B05D 7/14
(Continued)

*Primary Examiner* — Kira Nguyen

(57) ABSTRACT

A system for painting an interior wall of housing is disclosed. The system includes a semi-automatic painting robot 106 and a user device 104. The semi-automatic painting robot 106 includes a microprocessor 304, a servo drive module 306, a DC motor drive module 316, a magnetometer 312, a distance sensor module 318, a first servo motor 708, a second servo motor 714, a spray gun 710, and a belt driven linear actuator 804. A user device 104 captures one or more images of the interior wall to be painted, processes and sends the one or more images to the microprocessor 304 in co-ordinates of the interior wall. The microprocessor 304 receives the co-ordinates and performs the operations of painting on the interior wall using one or more painting strokes. The user 102 may control the semi-automatic painting robot 106 with the user interface present in the user device 104.

10 Claims, 14 Drawing Sheets

(51) Int. Cl.
  *B05B 12/04* (2006.01)
  *B05B 12/12* (2006.01)
  *G06Q 50/00* (2012.01)
  *B05B 12/00* (2018.01)
  *B25J 9/16* (2006.01)

(52) U.S. Cl.
  CPC ......... *B05B 13/0431* (2013.01); *G06Q 50/00* (2013.01); *B25J 9/161* (2013.01); *B25J 9/1617* (2013.01); *B25J 9/1661* (2013.01); *B25J 9/1679* (2013.01); *G05B 2219/45065* (2013.01)

(56) References Cited

U.S. PATENT DOCUMENTS

2017/0095825 A1* 4/2017 Manabe .................. B05D 1/02
2017/0252767 A1* 9/2017 Friedel ..................... B25J 5/02

* cited by examiner

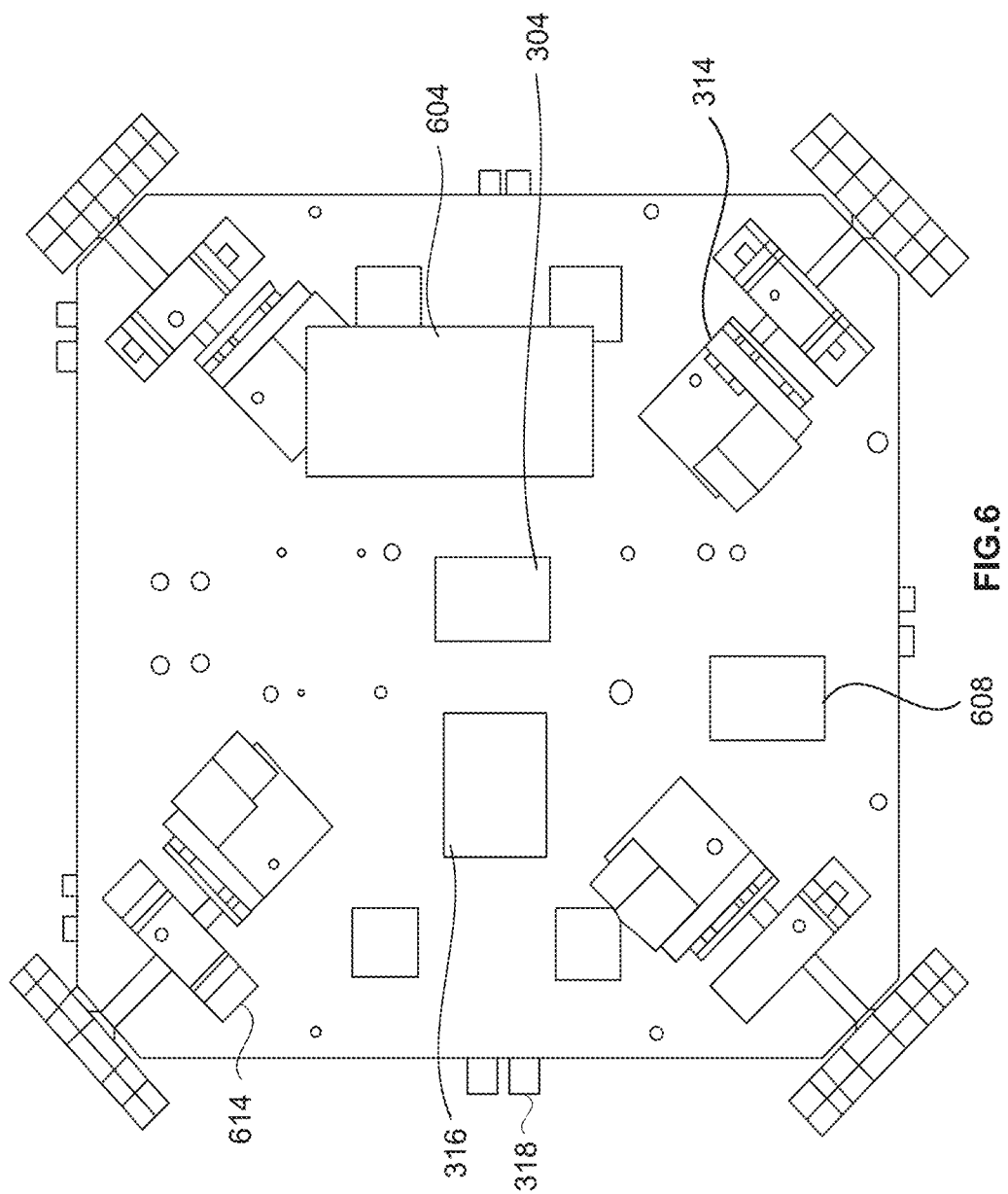

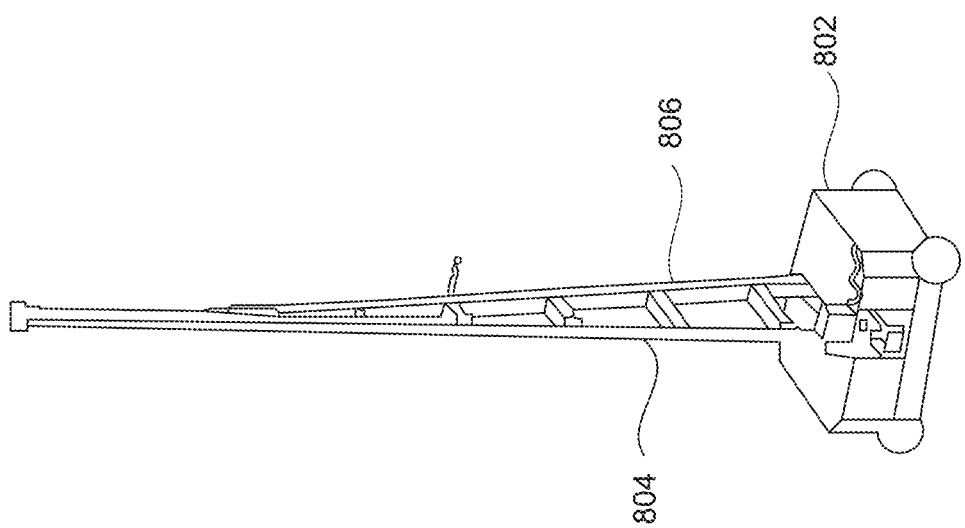

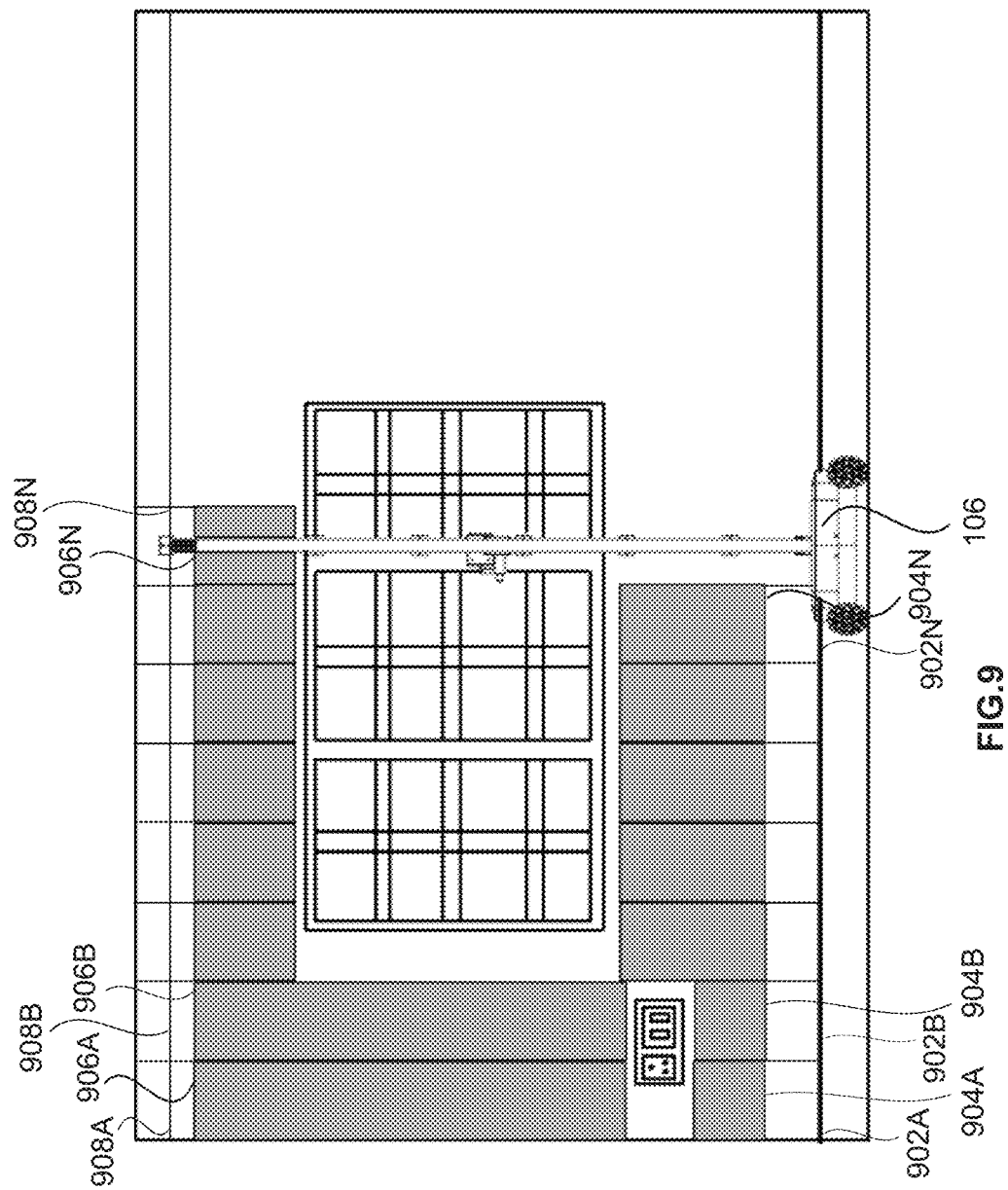

SYSTEM AND METHOD FOR PAINTING AN INTERIOR WALL OF HOUSING USING A SEMI-AUTOMATIC PAINTING ROBOT

CROSS-REFERENCE TO PRIOR FILED PATENT APPLICATIONS

This application claims priority from PCT Patent Application number PCT/IN2017/050075 filed on Feb. 25, 2017 the complete disclosure of which, in its entirely, is herein incorporated by reference.

BACKGROUND

Technical Field

The embodiments herein generally relate to a wall painting, and, more particularly, to a system and a method for applying paint on an interior wall by a semi-automatic painting robot.

Description of the Related Art

Painting is generally done with a brush and a can of paint. If a ladder was used, the can was hung by a hook on a rung of the ladder. If a step ladder was used, the can was set on a shelf on the back side of the step ladder. There is widespread use of the paint roller as a substitute for a brush, or as a supplement to a brush. Times have changed and spray guns have replaced paint rollers. Spray guns have long been used to effect uniform distribution of paint. Such spray guns are widely used in the automotive repair field, and other metal spraying situations. A typical paint sprayer employs a primary paint supply in the form of a manually changeable container. This primary paint supply (container) is filled with paint, which is passed through a filter as it is poured into the supply. The filtered paint supply container is used to provide paint to a gravity feed paint tank which must then be supported while paint drains into the spray gun.

In painting a house, apartment building or other structures having windows, painters have experienced difficulty in painting frames around window glass neatly and efficiently. Furthermore, after painting, window frames frequently become stuck in an open or closed position due to the inadvertent painting of the windows header and balances, or guide members. The problem of protecting the windows, particularly the window balances, header, and window glass, from being painted, splattered, or smudged has traditionally been solved primarily by applying adhesive masking tape to these window parts prior to painting. Pre-cut masking tape, and various other hand-held paint masks, work suitably, but are not reusable, and take time to apply, remove, and/or use accurately.

In a conventional case the brush painting of trim as commonly practiced is time-consuming, costly and the final appearance of the work is frequently imperfect. Therefore, the masking of window panes and adjacent areas of the house has been haphazard and without any established system, with the result that the masking is frequently imperfect and is so time-consuming and tedious than much of the benefit.

Accordingly, there remains a need for an improved system and method for painting an interior wall of housing.

SUMMARY

In view of the foregoing, an embodiment herein provides a system for painting an interior wall of housing. The system includes a user device, and a semi-automatic painting robot. The user device includes a device memory, and a device processor. The device memory stores a database and a set of modules. The device processor executes the set of modules. The set of modules includes an image capturing module, an affine transformation module, a co-ordinate transformation module, a non-paintable area distinguishing module, and a communication module. The image capturing module is configured to capture an image of the interior wall to be painted using a camera of the user device. The affine transformation module is configured to crop the image to obtain a cropped image and perform affine transformation on the cropped image. The co-ordinate transformation module is configured to convert pixels of the cropped image into co-ordinates of the interior wall. The non-paintable area distinguishing module is configured to distinguish a paintable area and a non-paintable area on the interior wall based on inputs of a user through interactions with the user device. The communication module communicates co-ordinates of the paintable area and the non paintable area for painting the interior wall. The semi-automatic painting robot includes a spray gun, a first servo motor, a second servo motor, a belt driven linear actuator, a magnetometer, and a microprocessor. The microprocessor executes all functions in the semi-automatic painting robot. The microprocessor includes a co-ordinates obtaining module, a navigation module, a distance determination module, an orientation module, a first paint stroke module, an overlap navigation module, a second paint stroke module, a trigger control module, a magnetic field sensor module, and a re-alignment module. The co-ordinates obtaining module is configured to receive co-ordinates of the paintable area and the non-paintable area from the user device. The navigation module is configured to navigate the semi-automatic painting robot to a start point near the interior wall through user interactions on the user device. The distance determination module is configured to measure a distance between the semi-automatic painting robot and the interior wall. The orientation module is configured to align the semi-automatic painting robot parallel to the interior wall based on the distance between the semi-automatic painting robot and the interior wall. The first paint stroke module is configured to apply a first paint stroke by (i) accelerating the belt driven linear actuator from a first stroke start point of the belt driven linear actuator to a first stroke initial point of the paintable area, (ii) maintaining constant velocity of the belt driven linear actuator from the first stroke initial point of the paintable area to a first stroke final point of the paintable area, and (iii) decelerating the belt driven linear actuator from the first stroke final point of the paintable area to a first stroke end point of the belt driven linear actuator. The overlap navigation module is configured to automatically navigate the semi-automatic painting robot by half of a fan width of the spray gun parallel to the interior wall for applying a second paint stroke by overlapping a half of the first paint stroke when the semi-automatic painting robot completes the first paint stroke. The second paint stroke module is configured to apply the second paint stroke by (i) accelerating the belt driven linear actuator from a second stroke end point of the belt driven linear actuator to a second stroke final point of the paintable area, (ii) maintaining constant velocity of the belt driven linear actuator from the second stroke final point of the paintable area to a second stroke initial point of the paintable area, and (iii) decelerating the belt driven linear actuator from the second stroke initial point of the paintable area to a second stroke start point of the belt driven linear actuator. The magnetic field sensor module is configured to measure magnetic field orientation readings of the semi-automatic painting robot with respect to earth's magnetic field. The re-alignment module is configured to re-align the semi-automatic painting robot in corner areas of the interior wall by a predefined angle of 45 degree and/or 90 degree based on the magnetic field orientation readings of the semi-automatic painting robot.

In one embodiment, the device processor includes an image stitching module is configured to stitch more than one images of the interior wall to obtain a combined image when the image capturing module captures one or more than one images of the interior wall.

In yet another embodiment, the microprocessor includes a area division module that is configured to virtually divide the interior wall in terms of width of the spray gun, that are adapted to determine number of paint strokes to be applied on the interior wall by the semi-automatic painting robot.

In yet another embodiment, the semi-automatic painting robot includes a servo drive module that monitors a servo motor and encoder module. The servo motor and encoder module is configured to guide the spray gun to apply the first paint stroke and the second paint stroke based on signals from the microprocessor.

In yet another embodiment, the semi-automatic painting robot includes a DC motor drive module that monitors a DC encoder and motor module. The DC motor and encoder module is configured for locomotion/navigation of the semi-automatic painting robot based on signals from the microprocessor.

In one aspect, one or more non-transitory computer readable storage mediums storing one or more sequences of instructions, which when executed by one or more processors, performs a method of painting an interior wall using a semi-automatic painting robot. The method includes steps of (i) capturing one or more than one images of an interior wall to be painted with a colored paper pasted on the interior wall using a camera of a user device, (ii) stitching the more than one images of the interior wall in an order to obtain a combined image of the interior wall, (iii) cropping the combined image to obtain a cropped image and affine transformation of the cropped image, (iv) converting pixels of the cropped image into co-ordinates of the interior wall, (v) demarcating between a paintable area and a non-paintable area based on inputs obtained through user interactions on the user device, (vi) navigating a semi-automatic painting robot to a start point near the interior wall based on inputs obtained through user interactions on the user device, (vii) aligning the semi-automatic painting robot parallel to the interior wall at a fixed distance based on a distance measured between the semi-automatic painting robot and the interior wall, (viii) applying a first paint stroke in a vertical manner from bottom to top on the interior wall, (ix) re-aligning the semi-automatic painting robot laterally on ground by half of a fan width of the spray gun for applying a second paint stroke, and (x) applying the second paint stroke by overlapping half of the first paint stroke from top to bottom in the vertical manner.

In an embodiment, the one or more non-transitory computer readable storage mediums storing one or more sequences of instructions, which when executed by one or more processors, the semi-automatic painting robot paints the paintable area on the interior wall using one or more painting strokes based on inputs of a user through user interactions on a user interface on said user device.

In another embodiment, the one or more non-transitory computer readable storage mediums storing one or more sequences of instructions, which when executed by one or more processors, the colored paper acts as a reference for (i) measuring height and length of the interior wall, and (ii) identifying co-ordinates of the non-paintable area.

In another embodiment, the one or more non-transitory computer readable storage mediums storing one or more sequences of instructions, which when executed by one or more processors, the constant velocity is maintained by the second servo motor while painting the paintable area to avoid paint dripping and to ensure optimum wall finish on the interior wall.

In yet another embodiment, the one or more non-transitory computer readable storage mediums storing one or more sequences of instructions, which when executed by one or more processors, the semi-automatic painting robot is navigated to corner areas of the interior wall to paint the corner areas of the interior wall based on user inputs through user interactions on the user device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6 is an exploded bottom view of the semi-automatic painting robot of FIG. 1, illustrating one or more components and their arrangements inside the semi-automatic painting robot of FIG. 1, according to an embodiment herein;

FIG. 8 illustrates a perspective view of the semi-automatic painting robot of FIG. 1 with a belt driven linear actuator for actuating a continuous movement of a spray gun for applying paint on an interior wall, according to an embodiment herein;

FIG. 9 illustrates the semi-automatic painting robot of FIG. 1 that paints a paintable area of an interior wall using one or more painting strokes, according to an embodiment herein;

DETAILED DESCRIPTION OF PREFERRED EMBODIMENTS

Figure 1:
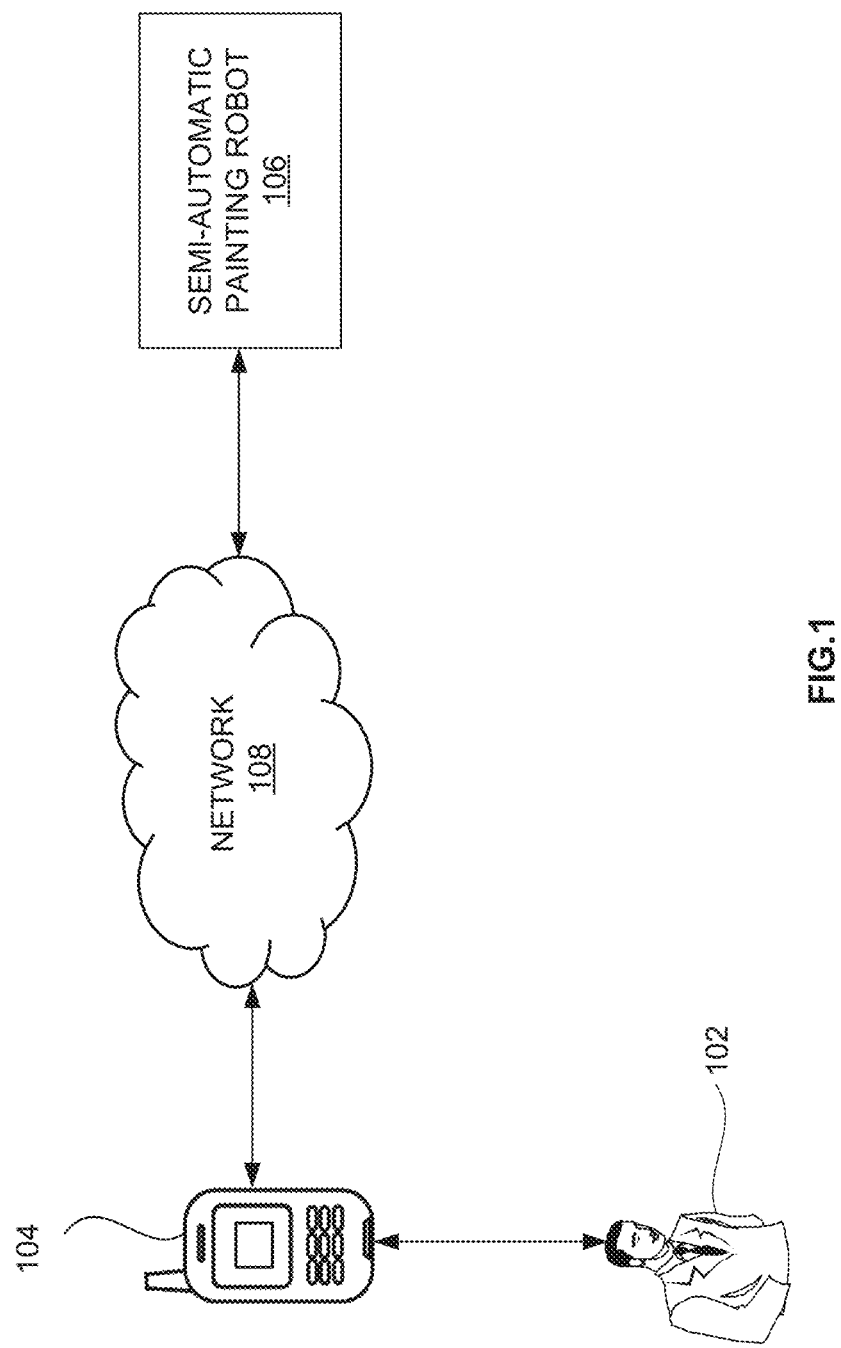
FIG. 1 illustrates a system view of a semi-automatic painting robot communicating with a user device through a network to receive commands for painting an interior wall, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Accordingly, there is a need for a systematized procedure for preparing the trim of house windows for spray painting. There is a need for a device which is expeditious, efficient and uncomplicated and with the device usage the house painters will not be discouraged from using the device and to be entirely practical and more economical than brush painting. The resulting appearance of the finished work should be far superior to brush painting. The embodiments herein achieve this by using a semi-automatic painting robot for painting an interior wall. Referring now to the drawings and more particularly to FIGS. 1 through 12, where similar reference characters denote corresponding features consistently throughout the figures, there are shown preferred embodiments.

FIG. 1 illustrates a system view of the semi-automatic painting robot 106 communicating with a user device 104 through a network 108 to receive commands for painting an interior wall, according to an embodiment herein. The semi-automatic painting robot 106 paints the interior wall with minimal human intervention. A user 102 interacts with the user device 104 through a mobile application and captures one or more images of the interior wall to be painted through a camera of the user device 104. The user device 104 processes the one or more images captured and convert the pixels of the one or more images captured in to co-ordinates of the interior wall. The user device 104 further allows the user 102 to distinguish between a paintable area and a non-paintable area on the interior wall by tapping on corners of the non-paintable area (e.g. windows). The co-ordinates of the interior wall including the paintable area co-ordinates and the non-paintable area co-ordinates are then communicated to the semi-automatic painting robot 106 through a network 108. In an embodiment, the network 108 is a Bluetooth, internet, and/or a wireless communication network.

In one embodiment, the user device 104 is a mobile phone, a tablet and/or a personal digital assistance (PDA). The mobile application is developed based on the compatibility of the user device 104 used by the user 102. The semi-automatic painting robot 106 may be controlled manually through the mobile application. In situation where there are tight corners, the user 102 can take the control of the semi-automatic painting robot 106, change the directions of the semi-automatic painting robot 106 and can apply the paint at the desired areas.

Figure 2:
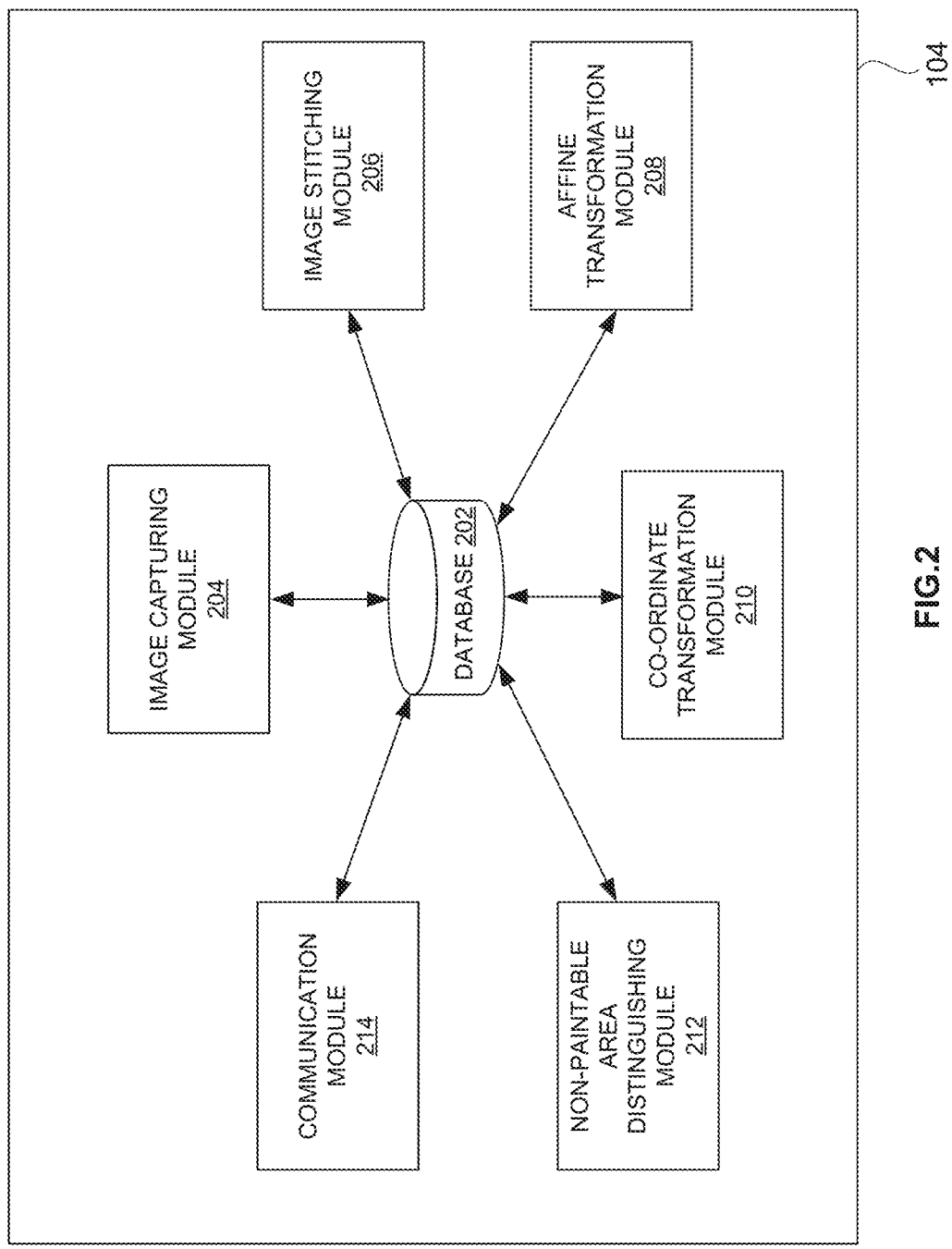
FIG. 2 illustrates an exploded view of the user device of FIG. 1, according to an embodiment herein.

FIG. 2 illustrates an exploded view of the user device 104 of FIG. 1, according to an embodiment herein. The user device 104 comprises of a database 202, an image capturing module 204, an image stitching module 206, an affine transformation module 208, a co-ordinate transformation module 210, a non-paintable area distinguishing module 212, and a communication module 214. The database 202 stores (i) one or more images of an interior wall to be painted, and (ii) co-ordinates of the interior wall corresponding to the respective images of the interior wall. The image capturing module 204 captures an image of the interior wall to be painted using the camera of the user device 104. The user 102 may capture one or more images, if the interior wall to be painted cannot be captured in a single image. The image stitching module 206 stitches the one or more images captured in the user device 104 to obtain a combined image of the interior wall. In an embodiment, the image stitching module 206 stitches the captured images in the order of the images captured. The affine transformation module 208 crops the combined image to obtain a cropped image and performs affine transformation. Affine transformation is adapted to analyse the parameters of the interior wall (i.e., height and length of the interior wall). Affine transformation makes the cropped image perpendicular to the plane with respect to the reference points selected which is the area of interest. The co-ordinate transformation module 210 converts pixels of the cropped image in to co-ordinates of the interior wall that are adapted to identify a start point and an end point of the interior wall. A coloured paper of known dimensions is pasted anywhere on the interior wall before capturing the images of the interior wall. The coloured paper acts a reference from which the various parameters like height and length of the interior wall are measured. The non-paintable area distinguishing module 212 distinguishes a paintable area and a non-paintable area on the interior wall based on the inputs of the user 102 through a user interface on the mobile application. In an embodiment, the user 102 taps on the diagonal corners of the non-paintable area of the cropped image to distinguish between the paintable area and the non-paintable area. The coloured paper acts a reference here also, to identify distance between the paintable area and the non-paintable area on the interior wall. The communication module 214 communicates the paintable area and the non-paintable area from the user device 104 to the semi-automatic painting robot 106 in the form of co-ordinates through a network 108. In an embodiment, the network 108 is a Bluetooth, internet and/or a wireless communication network.

Figure 3:
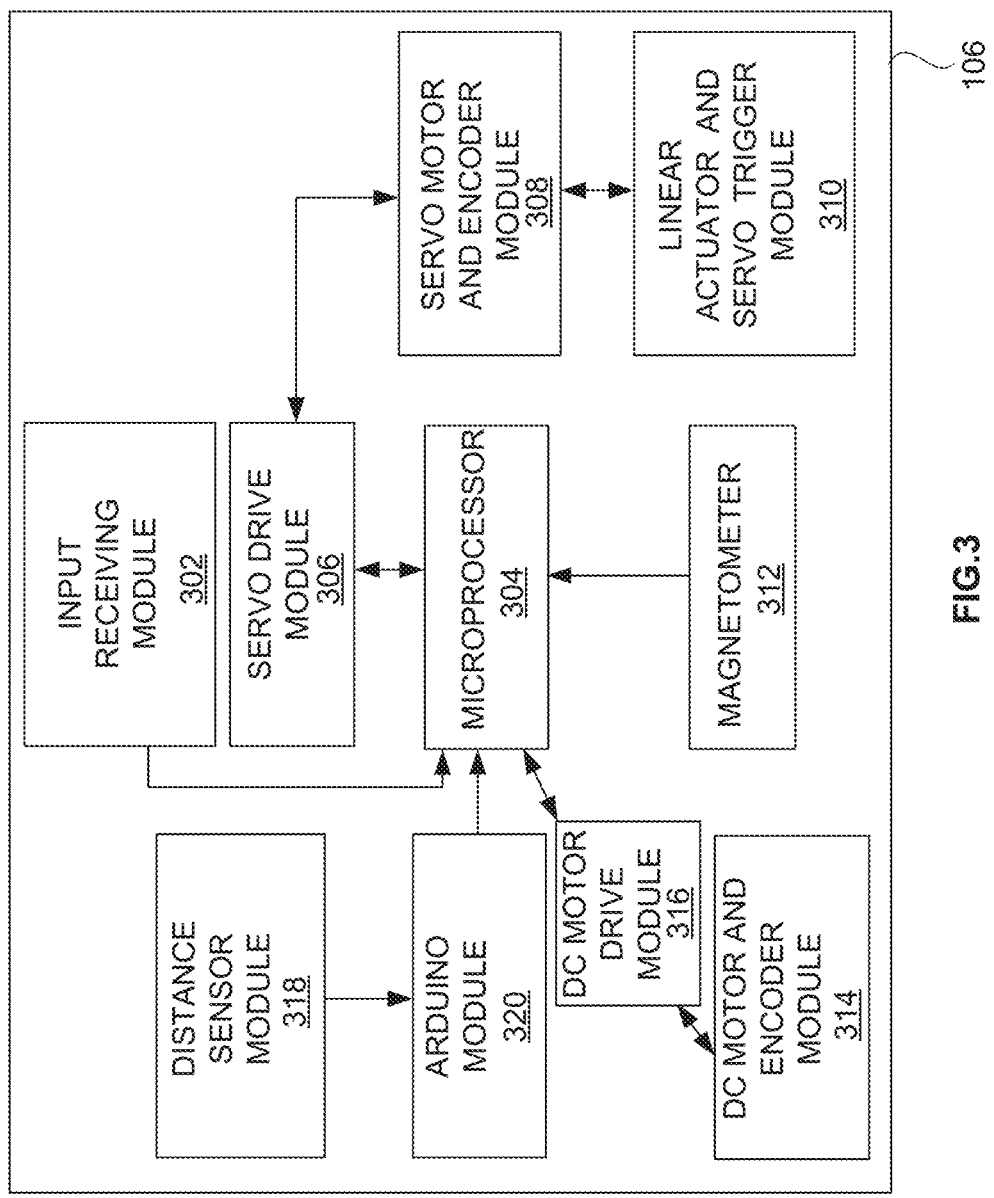
FIG. 3 illustrates an exploded view of the semi-automatic painting robot of FIG. 1, according to an embodiment herein.

FIG. 3 illustrates an exploded view of the semi-automatic painting robot 106 of FIG. 1, according to an embodiment herein. The semi-automatic painting robot 106 comprises of an input receiving module 302, a microprocessor 304, a servo drive module 306, a servo motor and encoder module 308, a linear actuator and servo trigger module 310, a magnetometer 312, a DC encoder and motor module 314, a DC motor drive module 316, a distance sensor module 318, and an arduino module 320. The input receiving module 302 is adapted to obtain inputs from the user 102 to control the navigation of the semi-automatic painting robot 106. The microprocessor 304 (CPU with memory, I/O peripherals and additional features) performs most of the processing (e.g., brain of the robot) in the semi-automatic painting robot 106. The microprocessor 304 communicates with one or more components within the semi-automatic painting robot 106 and integrates the whole process. The servo motor and encoder module 308 includes a second servo motor, adapted to drive a spray gun mounted on a belt driven linear actuator from bottom to top and top to bottom vertically. The linear actuator and servo trigger module 310 includes a first servo motor, adapted to trigger the spray gun mounted on the belt driven linear actuator. Readings from the second servo motor are sent to the microprocessor 304 via the respective encoder from the servo motor and encoder module 308 through the servo drive module 306 for precise control of the second servo motor. The servo drive module 306 acts as a feedback sensor of the second servo motor and continually adjust for deviation from the expected behavior of the second servo motor. The first servo motor is adapted to trigger the spray gun using a servo trigger while painting the paintable areas. The second servo motor is adapted to drive the spray gun in a vertical manner mounted on the belt driven linear actuator. The magnetometer 312 is adapted to measure the orientation of the semi-automatic painting robot 106 on a floor that are adapted to navigate the semi-automatic painting robot 106 in tight corner areas manually. The semi-automatic painting robot 106 includes four omni wheels which are responsible for the locomotion of the semi-automatic painting robot 106 on the floor. The DC motor and encoder module 314 includes four DC motors and encoders, each of which is connected to an omni wheel of the semi-automatic painting robot 106. The omni wheels are wheels with small discs around the circumference which are perpendicular to the turning direction. In an embodiment, the omni wheels are adapted to drive the semi-automatic painting robot 106 with full force, but will also slide laterally with great ease. The omni wheels provide the semi-automatic painting robot 106, the ability to move in any direction maintaining the same orientation. Readings are sent to microprocessor 304 via the respective encoders from the DC motor and encoder module 314 through the DC motor drive module 316 for precise control of each of the DC motors and encoders. The DC motor drive module 316 monitors the feedback signal from the DC motor and encoder module 314 and continually adjust for deviation from expected behaviour of the DC motors based on the signals from the microprocessor 304 that are adapted for locomotion of the semi-automatic painting robot 106. The distance sensor module 318 is used to measure distance between the semi-automatic painting robot 106 and the interior wall. The distance sensor module 318 is further adapted to make sure that the semi-automatic painting robot 106 is maintained parallel to the interior wall at a particular distance. In an embodiment, the distance sensor module 318 determines the distance using at least one of ultrasonic sensors, laser sensors, proximity sensors, etc. The arduino module 320 gets input from the distance sensor module 318, and converts it into respective distances and sends it to the microprocessor 304 for processing its position relative to the wall. In one embodiment the arduino module 320 may be a microcontroller (CPU without memory).

Figure 4:
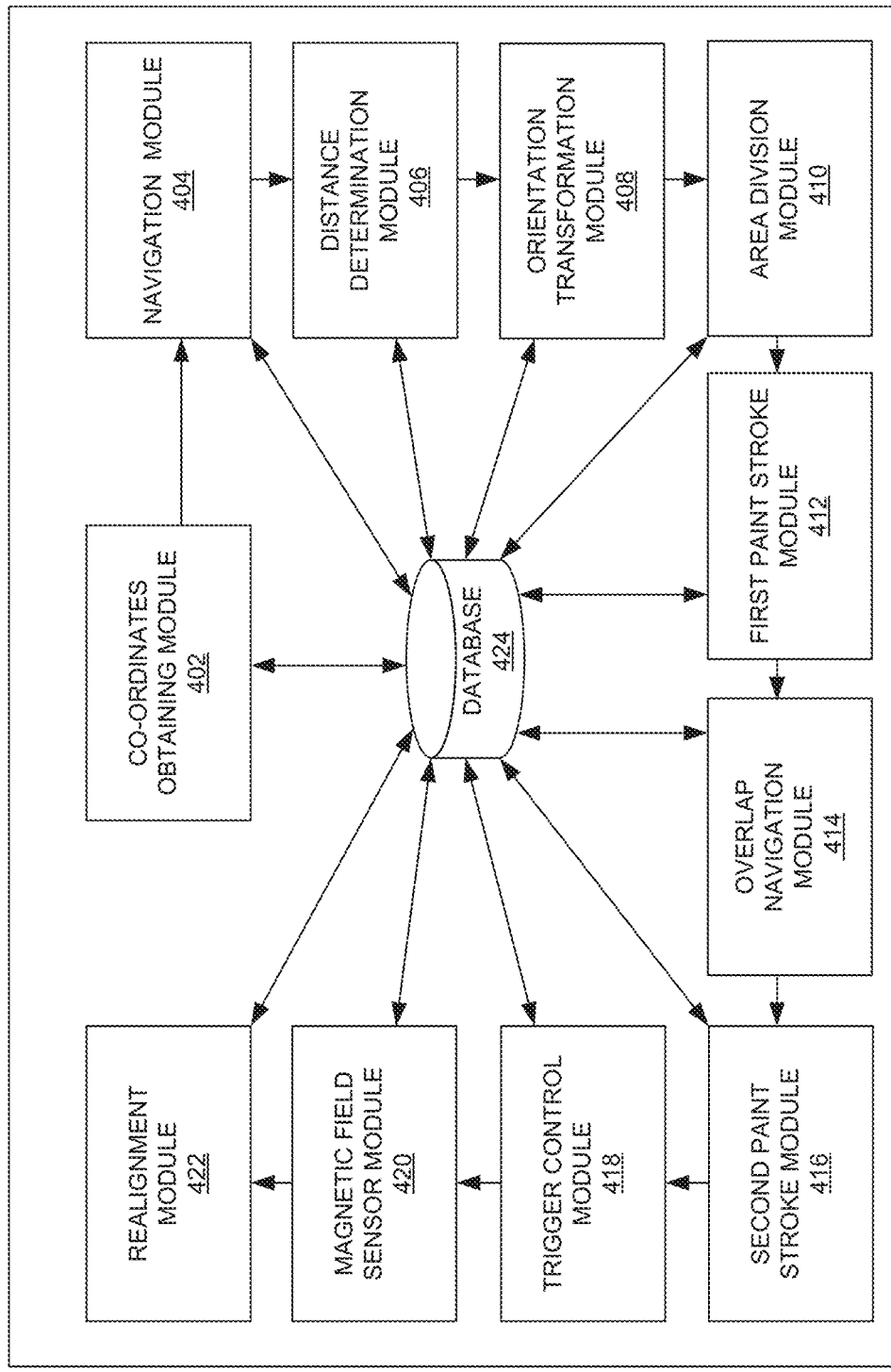
FIG. 4 illustrates an exploded view of a microprocessor in the semi-automatic painting robot of FIG. 1, according to an embodiment herein.

FIG. 4 illustrates an exploded view of the microprocessor 304 in the semi-automatic painting robot 106 of FIG. 1, according to an embodiment herein. The microprocessor 304 includes a co-ordinates obtaining module 402, a navigation module 404, a distance determination module 406, an orientation module 408, an area division module 410, a first paint stroke module 412, an overlap navigation module 414, a second paint stroke module 416, a trigger control module 418, a magnetic field sensor module 420, and a re-alignment module 422. The co-ordinates obtaining module 402 is adapted to obtain co-ordinates of the paintable area and the non-paintable area of an interior wall. The navigation module 404 is adapted to initially navigate the semi-automatic painting robot 106 to a start point near the interior wall to be painted based on user interactions on the user device 104. The distance determination module 406 determines the distance between the semi-automatic painting robot 106 and the interior wall. The orientation module 408 aligns the semi-automatic painting robot 106 parallel to the interior wall at a fixed distance that is adapted for painting the interior wall. The area division module 410 divides the area of the interior wall with respect to a width of a spray gun to determine number of paint strokes to be painted on the interior wall. The first paint stroke module 412 is configured to apply a first paint stroke from bottom to top on the interior wall by (i) accelerating the belt driven linear actuator from a first stroke start point of the belt driven linear actuator to a first stroke initial point of the paintable area, (ii) maintaining constant velocity of the belt driven linear actuator from the first stroke initial point of paintable area to a first stroke final point of the paintable area, and (iii) decelerating the belt driven linear actuator from the first stroke final point of the paintable area to a first stroke end point of the belt driven linear actuator. The overlap navigation module 414 navigates the semi-automatic painting robot 106 parallel to the interior wall by a half fan width of the spray gun that is adapted to apply a second paint stroke by overlapping half of the first paint stroke. The overlapping between the first paint stroke and the second paint stroke provides a superior quality painting on the interior wall. The second paint stroke module 416 is configured to apply the second paint stroke on the interior wall by (i) accelerating the belt driven linear actuator from an second stroke end point of belt driven linear actuator to a second stroke final point of the paintable area, (ii) maintaining constant velocity of the belt driven linear actuator from the second stroke final point of the paintable area to a second stroke initial point of the paintable area, and (iii) decelerating the belt driven linear actuator from the second stroke initial point of the paintable area to a second stroke start point of the belt driven linear actuator. The second paint stroke module 416 paints the second paint stroke from top to bottom by overlapping half of the first paint stroke. The trigger control module 418 is configured to activate the first servo motor to trigger the spray gun while painting the paintable area. The magnetic field sensor module 420 is configured to measure magnetic field orientation readings of the semi-automatic painting robot 106 with respect to earth's magnetic field. The re-alignment module 422 is adapted to navigate the semi-automatic painting robot 106 by a predefined angle (90 degree and 45 degree) manually based on magnetic field orientation readings.

Figure 5A:
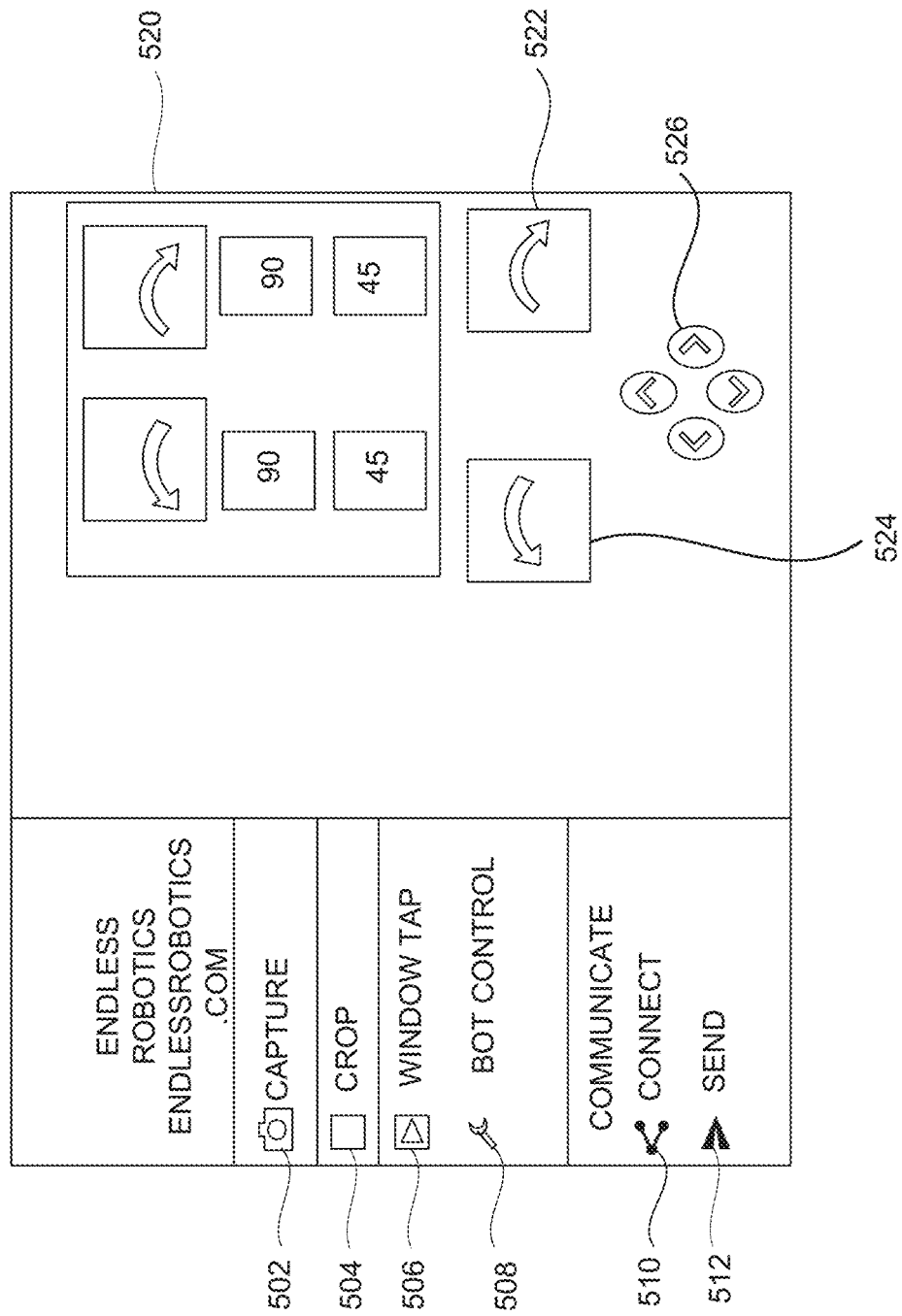
FIGS. 5A-5B illustrate an user interface views of the user device of FIG. 1 providing commands to the semi-automatic painting robot of FIG. 1, according to an embodiment herein.
Figure 5B:
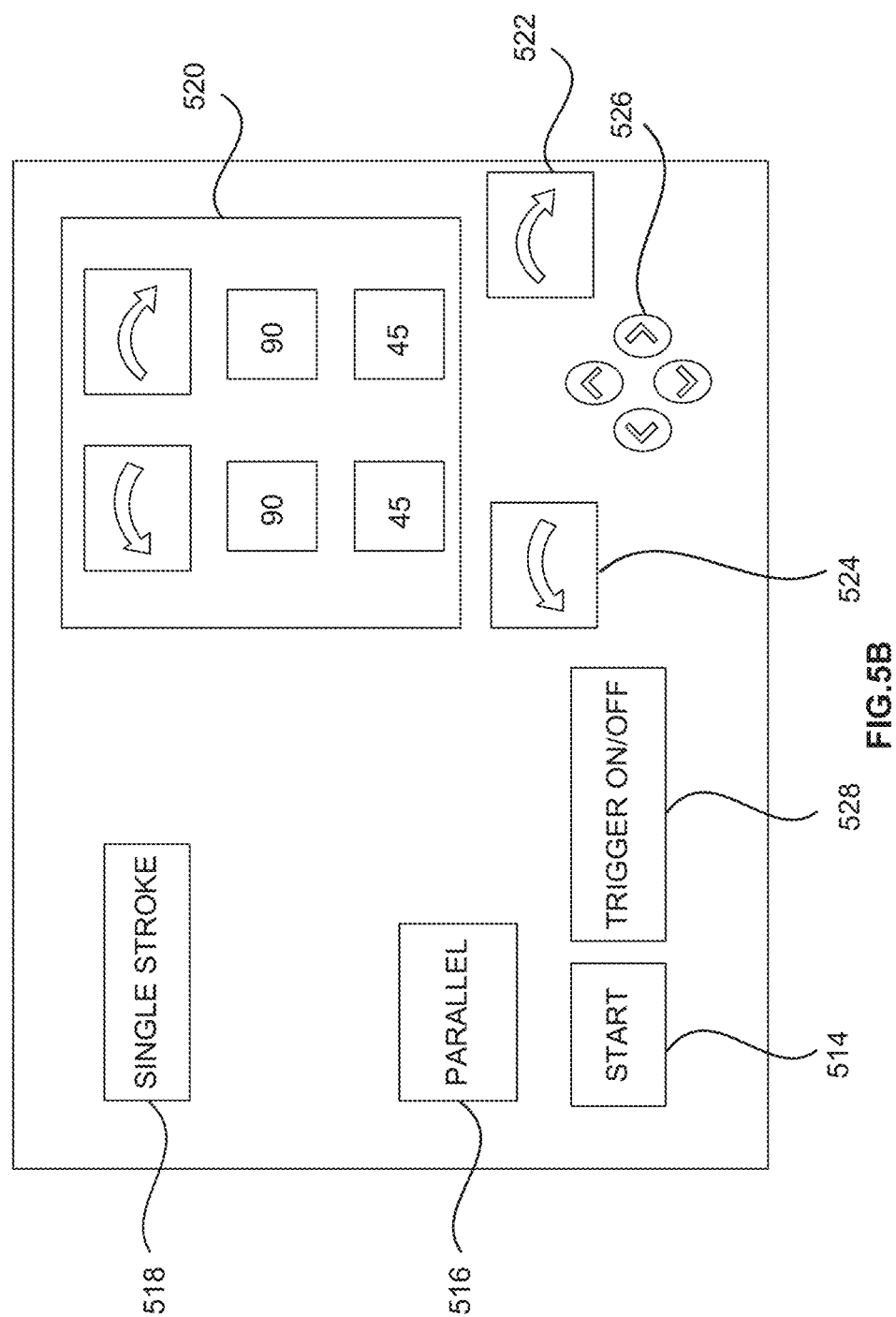

FIGS. 5A-5B illustrate an user interface views of the user device 104 of FIG. 1 providing commands to the semi-automatic painting robot 106 of FIG. 1, according to an embodiment herein, A user interface of the mobile application is displayed in the user device 104. The user 102 may capture an image of an interior wall by selecting capture 502 button. The user 102 may crop the image by selecting crop 504 button. The user 102 may window tap to select the non-paintable area of the interior wall by selecting window tap 506 button. The user 102 may control the semi-automatic painting robot 106 by selecting control the Bot control 508 button. The user 102 can connect with other devices by selecting connect 510 button. The user 102 may send the one or more images to other devices by selecting send 512 button. The user 102 by selecting start 514 button in the user device 104, paints the wall automatically by processing the captured images and implementing respective commands using the semi-automatic painting robot 106. The semi-automatic painting robot 106 is positioned parallel to the interior wall by selecting the parallel 516 button in the user device 104. A single stroke of paint is applied to the interior wall by the semi-automatic painting robot 106 by selecting the single stroke 518 button in the user device 104. The semi-automatic painting robot is turned by 45 degrees or 90 degrees based on the degree selection by selecting rotate left/right 520 button in the user device 104. The semi-automatic painting robot 106 is freely rotated to right and left by selecting the free rotate right 522 button and free rotate left 524 button in the user device 104 respectively. The semi-automatic painting robot 106 can be controlled in all the four directions on the ground by selecting the navigational commands 526 buttons in the user device 104. The user 102 may control the spray gun by selecting trigger on/off 528 button in the user device 104.

FIG. 6 is an exploded bottom view of the semi-automatic painting robot 106 of FIG. 1, illustrating one or more components and their arrangements inside the semi-automatic painting robot 106 of FIG. 1, according to an embodiment herein. The microprocessor 304 (CPU with memory, I/O peripherals and additional features) performs most of the processing (e.g., brain of the robot) in the semi-automatic painting robot 106. Once the co-ordinates are sent by the user device 104, the microprocessor 304 receives the signals and sends appropriate commands to all the actuators/motors and gets feedback from the respective encoders, the distance determination sensors (from arduino module 320) and magnetometer 312 and integrates the whole process. A switch mode power supply (SNIPS) 604 converts AC Power to DC power. The SNIPS 604 converts 220V AC from grid to 24v, 12v DC power as per the component requirements. The DC motor and encoder 314 is a rotary actuator that runs on DC Power. The DC motor and encoder module 314 include four DC motors and encoders. Each DC motor and encoder are connected to each of 4 omni wheels and are responsible for the locomotion of the semi-automatic painting robot 106 on a floor. The DC encoders act as a feedback sensor for the DC motors. Readings are sent to the microprocessor 304 via the respective DC encoder through a DC motor drive module 316 for precise control of DC motors. The DC motor drive module 316 monitors the feedback signal from the DC motor and encoder module 314 and continually adjust for deviation from expected behaviour of the DC motors based on the signals from the microprocessor 304. The arduino 320 gets input from distance sensor module 318, and converts it into respective distances and sends it to the microprocessor 304 for processing the position of the semi-automatic painting robot 106 relative to the interior wall. In one embodiment the arduino 320 may be a microcontroller (CPU without memory). The distance sensor module 318 is used to measure distance by using sound waves. In an embodiment, the distance sensor module 318 is a proximity sensor module, contact based sensor module, etc. that are used to measure the distance between the semi-automatic painting robot 106 and the interior wall. The distance sensor module 318 is further used to make sure that the semi-automatic painting robot 106 is maintained parallel to the interior wall at a particular distance. A housing bearing 614 is incorporated in to the semi-automatic painting robot 106, to protect the entire structure from collapsing and to give enough support to the omni wheels.

Figure 7:
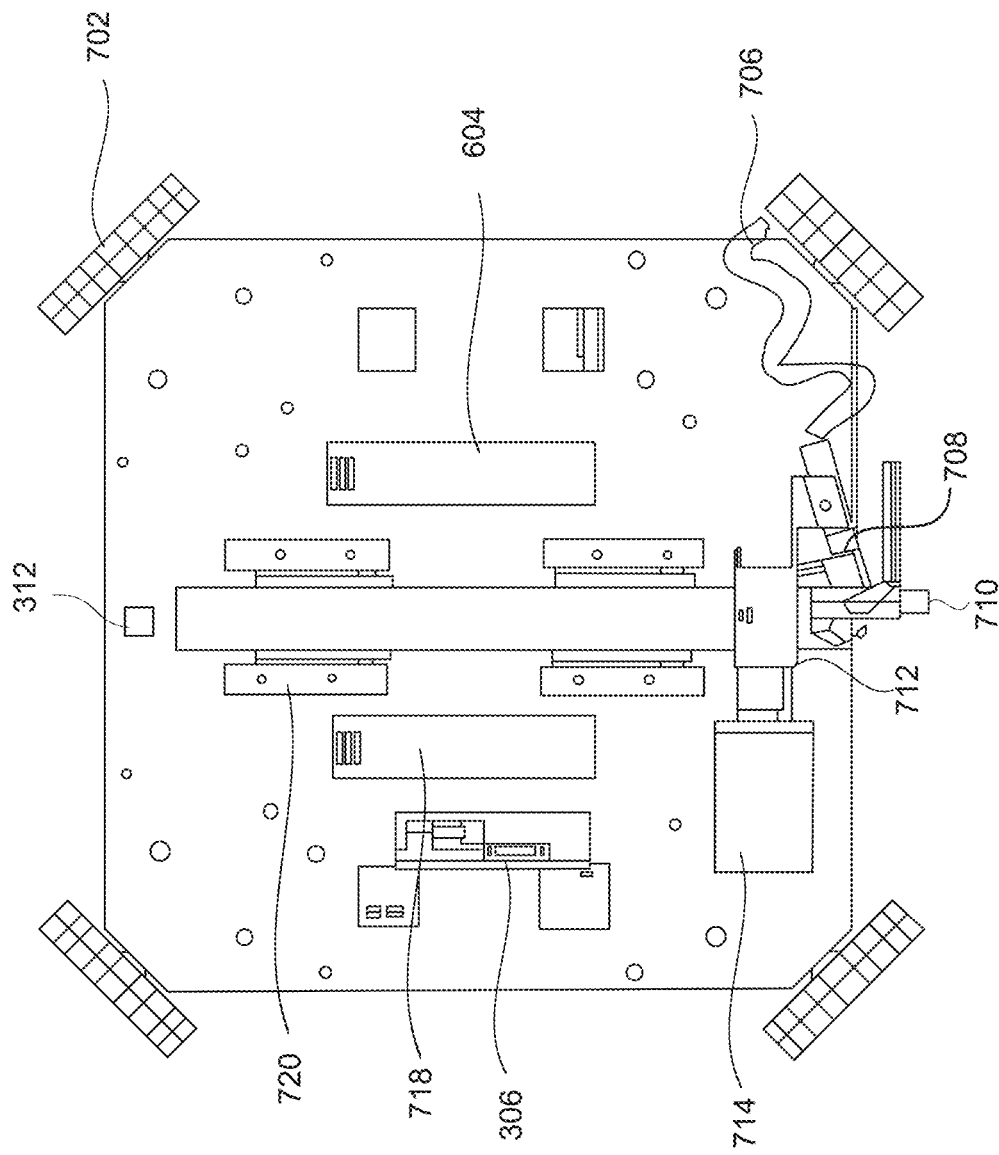
FIG. 7 is an exploded top view of the semi-automatic painting robot of FIG. 1, illustrating one or more components and their arrangements inside the semi-automatic painting robot of FIG. 1, according to an embodiment herein.

FIG. 7 is an exploded top view of the semi-automatic painting robot 106 of FIG. 1, illustrating one or more components and their arrangements inside the semi-automatic painting robot 106 of FIG. 1, according to an embodiment herein. The omni wheels 702 are wheels with small discs around the circumference which are perpendicular to the turning direction. The omni wheels 702 are adapted for locomotion as the semi-automatic painting robot 106 can be driven with full force. The omni wheels 702 are further adapted to slide laterally with great ease. The omni wheels 702 provide the semi-automatic painting robot 106 the ability to move in any direction maintaining the fixed distance between the semi-automatic painting robot 106 and an interior wall. The switch mode power supply (SNIPS) 604 converts AC Power to DC power. The SNIPS 604 converts 220V AC from grid to 24v, 12v DC power as per the component requirements. The SMPS 604 supplies the adequate amount of electrical energy for the electromagnetic locks. Paint hose 706 supplies paint from a paint container to the spray gun 710. The microprocessor 304 sends a signal to the first servo motor 708 to trigger the spray gun 710 mechanically. The spray gun 710 paints the interior wall vertically from bottom to top of the interior wall with the help of a belt driven linear actuator. The belt driven linear actuator is a pulley belt system driven by the second servo motor 714 used to drive the spray gun from bottom to top and top to bottom to paint the interior wall. The belt driven linear actuator holds the spray gun 710 and the first servo motor 708 and guides the spray gun 710 to paint the interior wall in a vertical manner. The second servo motor 714 is a rotary actuator that allows for precise control of linear position, velocity and acceleration of the belt driven linear actuator. The semi-automatic painting robot 106, in which the second servo motor 714 is used to drive the belt driven linear actuator and the first servo motor 708 is used to trigger the spray gun 710. The Servo drive module 306 continually monitor the second servo motor 714 by communicating with the servo motor and encoder module 308 and continually adjust for deviation from expected behaviour of the second servo motor 714 based on signals from microprocessor 304. The switch mode power supply (SNIPS) 604 converts AC Power to DC power. The switch mode power supply (SNIPS) 604 convert's 220V AC from grid to 24v for the servo drive module 306. Four electromagnetic locks 720 are placed on the either side of the belt driven linear actuator to support the structure while the painting is under process. The magnetometer 312 provides information of the semi-automatic painting robot's 106 orientations about its own magnetic field. The magnetometer 312 is used to measure magnetic field orientation of the semi-automatic painting robot 106 on the floor and re-align the semi-automatic painting robot 106.

FIG. 8 illustrates a perspective view of the semi-automatic painting robot 106 of FIG. 1 with a belt driven linear actuator 804 for actuating a continuous movement of the spray gun 710 for applying paint on an interior wall, according to an embodiment herein. A housing 802 covers the entire structure of the semi-automatic painting robot 106. The belt driven linear actuator 804 is a pulley belt system adapted to drive the spray gun 710 mounted on the belt driven linear actuator 804 for painting the interior wall in a vertical manner. A support structure 806 supports the belt driven linear actuator 804 for stability towards a recoil velocity of the spray gun 710.

FIG. 9 illustrates the semi-automatic painting robot 106 of FIG. 1 that paints a paintable area on an interior wall using one or more painting strokes, according to an embodiment herein. The semi-automatic painting robot 106 paints the interior wall by using one or more paint strokes. The semi-automatic painting robot 106 applies the first paint stroke from bottom to top by (i) accelerating the belt driven linear actuator 804 from a first stroke start point 902A of the belt driven linear actuator 804 to a first stroke initial point 904A of the paintable area, (ii) maintaining constant velocity of the belt driven linear actuator 804 from the first stroke initial point 904A of paintable area to a first stroke final point 906A of the paintable area, and (iii) decelerating the belt driven linear actuator 804 from the first stroke final point 906A of said paintable area to a first stroke end point 908A of the belt driven linear actuator 804. The semi-automatic painting robot 106 activates the first servo motor 708 to trigger the spray gun 710 while painting the paintable areas that avoids painting on the non-paintable areas on the first paint stroke. The semi-automatic painting robot 106 navigates automatically to a half of the fan width of the spray gun 710 once the semi-automatic painting robot 106 completes the first paint stroke. The semi-automatic painting robot 106 applies the second paint stroke from top to bottom, overlapping half of the first paint stroke by (i) accelerating the belt driven linear actuator 804 from an second stroke end point 908B of the belt driven linear actuator 804 to a second stroke final point 906B of the paintable area, (ii) maintaining constant velocity of the belt driven linear actuator 804 from the second stroke final point 906B of the paintable area to a second stroke initial point 904B of the paintable area, and (iii) decelerating the belt driven linear actuator 804 from the second stroke initial point 904B of the paintable area to a second stroke start point 902B of the belt driven linear actuator 804. The semi-automatic painting robot 106 activates the first servo motor 708 to trigger the spray gun 710 while painting the paintable areas that avoids painting on the non-paintable areas on the second paint stroke. Similarly, the semi-automatic painting robot 106 paints the paintable area on the other paint strokes on the interior wall.

Figure 10A:
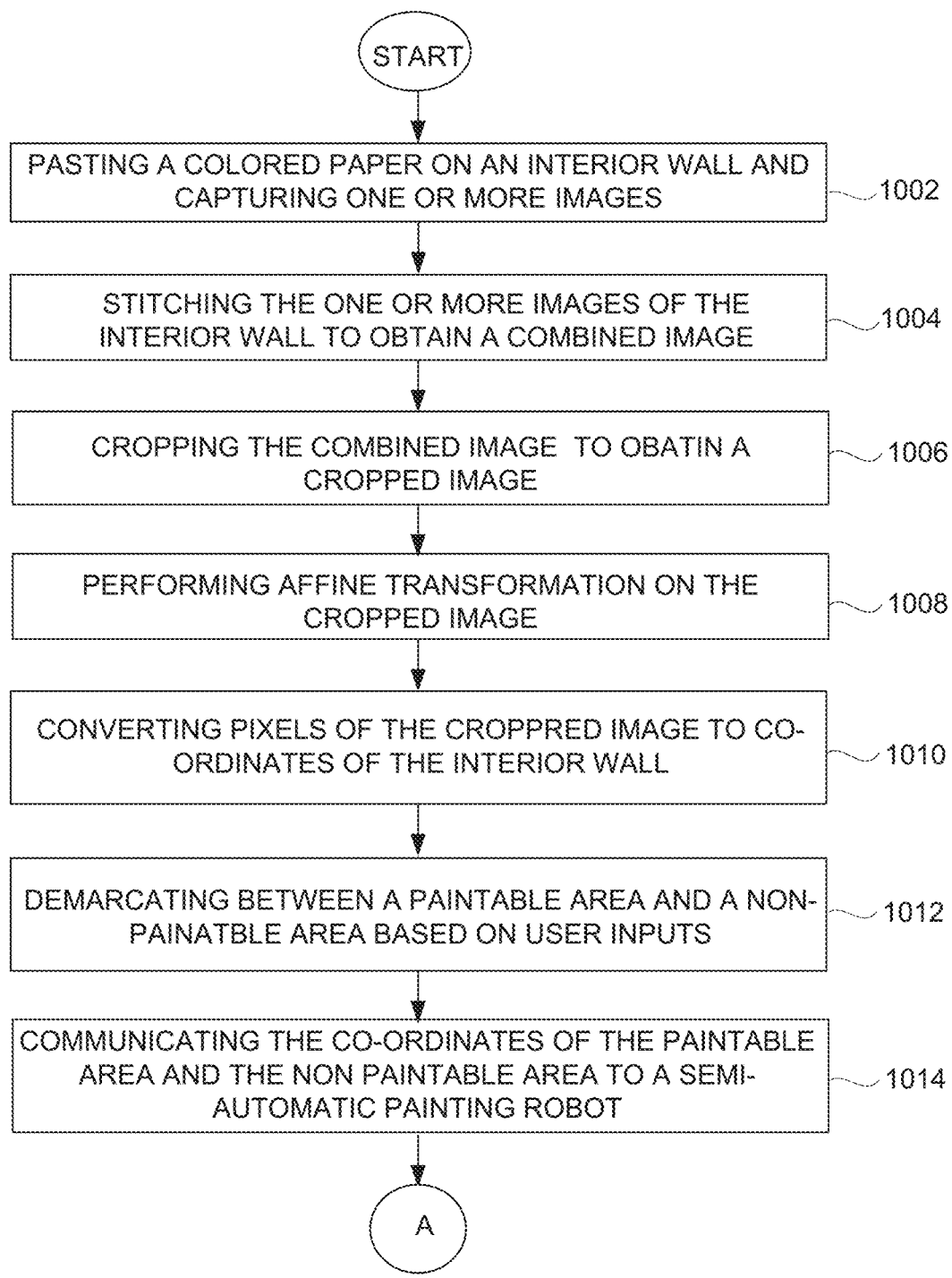
FIGS. 10A-10B are flow diagrams illustrating a method of painting an interior wall using the semi-automatic painting robot of FIG. 1, according to an embodiment herein.
Figure 10B:
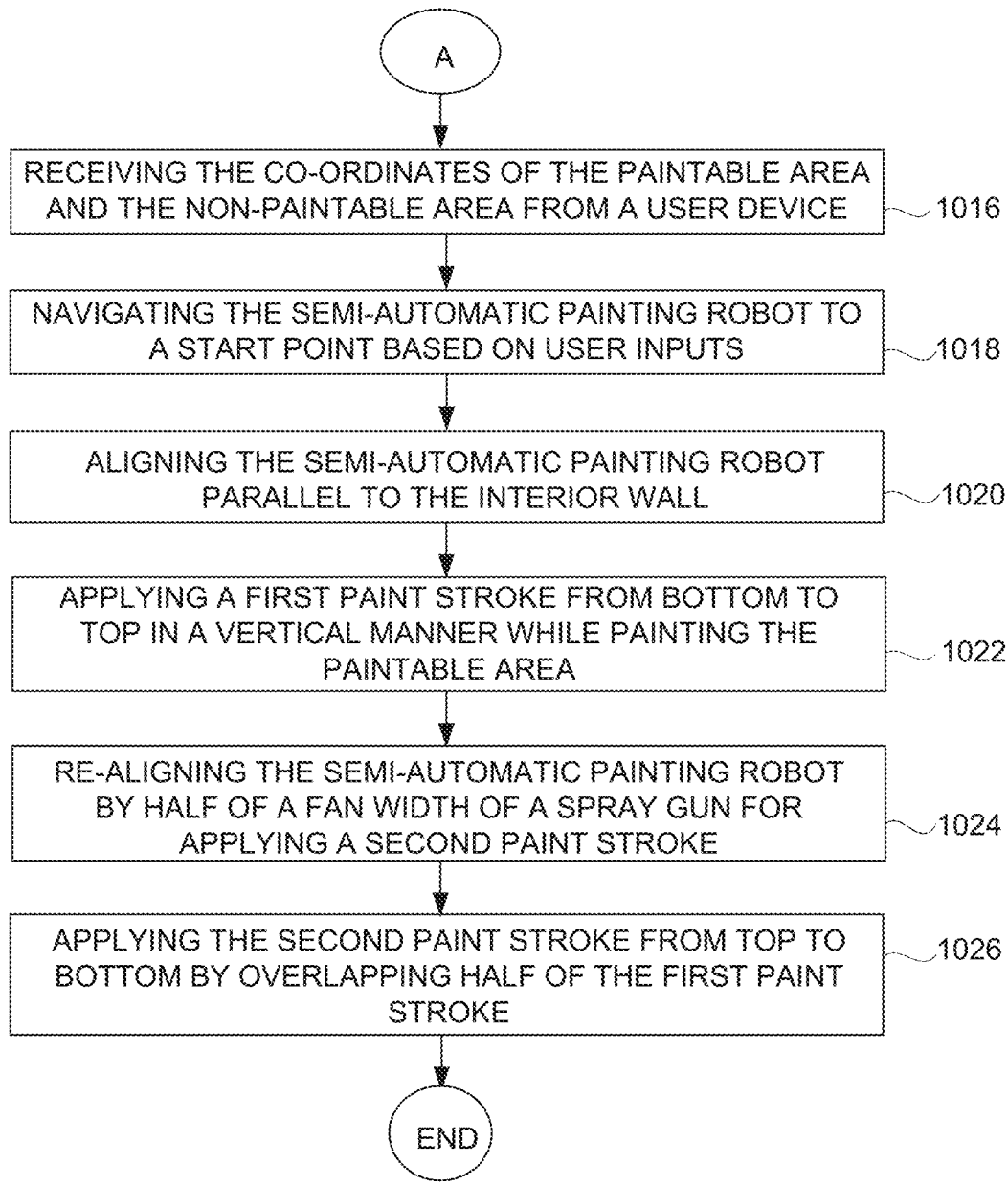

FIG. 10A-10B is a flow diagram illustrating a method for painting an interior wall using the semi-automatic painting robot 106 of FIG. 1, according to an embodiment herein. At step 1002, a colored paper is pasted on the interior wall and then an image is captured by a camera of a user device. In an embodiment, the interior wall is captured in one or more images when the interior wall cannot be captured in a single image. At step 1004, the one or more images captured are stitched in the user device to obtain a combined image. At step 1006, the combined image is cropped to obtain a cropped image, adapted to crop exact size of the interior wall. At step 1008, an affine transformation is performed on the cropped image, adapted to make the cropped image perpendicular to the plane. At step 1010, the pixels of the cropped image are converted to co-ordinates of the interior wall, adapted to identify a start point and end point of the interior wall. At step 1012, a paintable area and a non-paintable area are demarcated on the interior wall based on inputs of a user 102. At step 1014, the paintable area and the non-paintable area are communicated to a semi-automatic painting robot. At step 1016, the co-ordinates of the paintable area and the non-paintable area are received from the user device. At step 1018, the semi-automatic painting robot is navigated to start point near the interior wall based on the user input. At step 1020, the semi-automatic painting robot is aligned parallel to the interior wall based on a distance measured between the semi-automatic painting robot and the interior wall. At step 1022, a first paint stroke is applied excluding the non paintable area in a vertical manner from bottom to top. At step 1024, the semi automatic painting robot is re-aligned by half of a fan width of a spray gun for applying a second paint stroke. At step 1026, the second paint stroke is applied by overlapping half of width of the first paint stroke. In an embodiment, the distance between the semi-automatic painting robot and the interior wall is measured using the distance determination sensors (e.g. ultrasonic sensors, contact based sensors, laser sensors, proximity sensors, etc). In another embodiment, the overlapping between the first paint stroke and the second paint stroke is adapted to obtain superior quality of paint finishing.

Figure 11:
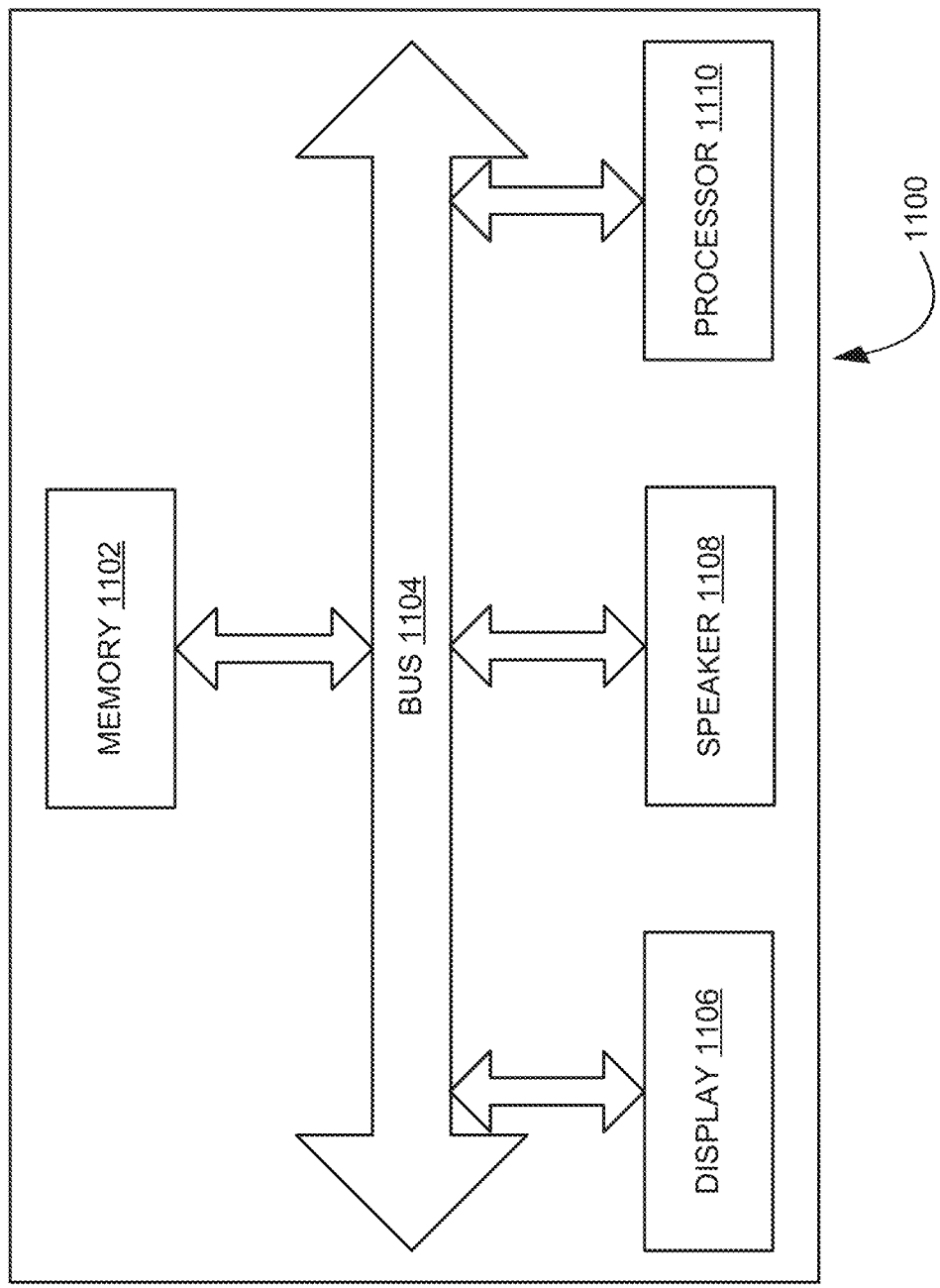
FIG. 11 illustrates an exploded view of the user device of FIG. 1, according to an embodiment herein.

FIG. 11 illustrates an exploded view 1100 of the user device 104 of FIG. 1 having a memory 1102 having a set of instructions, a bus 1104, a display 1106, a speaker 1108, and a processor 1110 capable of processing the set of instructions to perform any one or more of the methodologies herein, according to an embodiment herein. The processor 1110 may also enable digital content to be consumed in the form of video for output via one or more displays 1106 or audio for output via speaker and/or earphones 1108. The processor 1110 may also carry out the methods described herein and in accordance with the embodiments herein.

Digital content may also be stored in the memory 1102 for future processing or consumption. The memory 1102 may also store program specific information and/or service information (PSI/SI), including information about digital content (e.g., the detected information bits) available in the future or stored from the past. A user of the receiver 1100 may view this stored information on display 1006 and select an item of for viewing, listening, or other uses via input, which may take the form of keypad, scroll, or other input device(s) or combinations thereof. When digital content is selected, the processor 1110 may pass information. The content and PSI/SI may be passed among functions within the receiver 1100 using the bus 1104.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and. Ethernet cards are just a few of the currently available types of network adapters.

Figure 12:
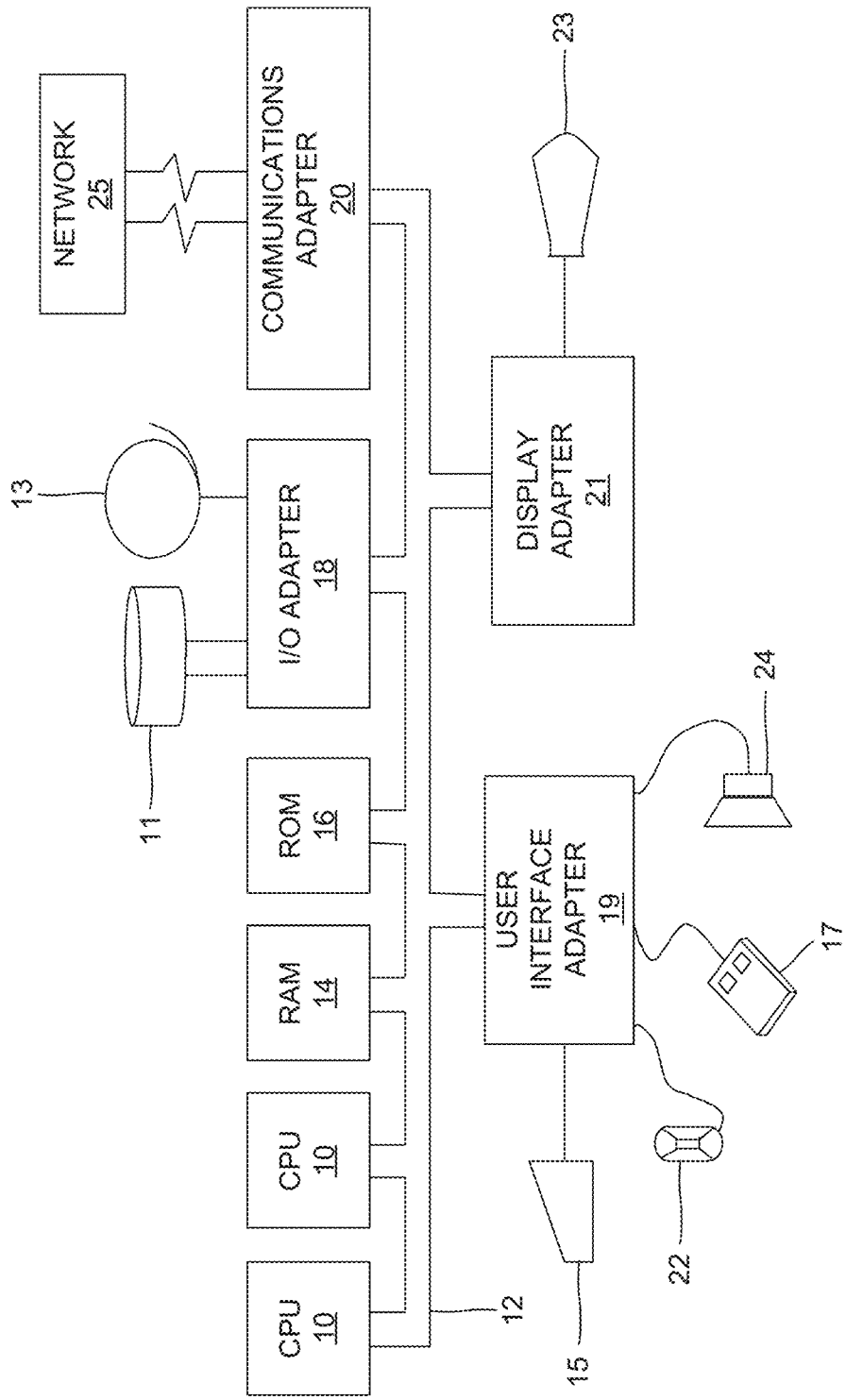
FIG. 12 illustrates a schematic diagram of computer architecture, according to the embodiments herein.

A representative hardware environment for practicing the embodiments herein is depicted in FIG. 12. This schematic drawing illustrates a hardware configuration of a computer architecture/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network. 25, and a display adapter 21 connects the bus 12 to a display device 23 which may be embodied as an output device such as a monitor, printer, or transmitter, for example.

The semi-automatic painting robot 106 is easy to operate and works efficiently. The semi-automatic painting robot 106 reduces the time taken for painting the interior wall excluding the non-paintable area. The semi-automatic painting robot 106 is capable of painting the interior wall efficiently with less manual intervention and the quality of paint finish on the interior wall would be superior compared to hand brush strokes due to the robotic consistency.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:

1. A system for painting an interior wall of housing, comprising:
 a user device 104 that comprises
  a device memory that stores a database 202 and a set of modules; and
  a device processor that executes said set of modules, wherein said set of modules comprises
   an image capturing module 204 that is configured to capture an image of said interior wall to be painted using a camera of said user device 104;
   an affine transformation module 208 that is configured to crop said image to obtain a cropped image and perform affine transformation on said cropped image;
   a co-ordinate transformation module 210 that is configured to convert pixels of said cropped image into co-ordinates of said interior wall;
   a non-paintable area distinguishing module 212 that is configured to distinguish a paintable area and a non-paintable area on said interior wall based on inputs of a user through interactions with said user device 104;
   a communication module 214 that communicates co-ordinates of said paintable area and said non paintable area for painting said interior wall;
 a semi-automatic painting robot 106 that comprises a spray gun 710, a first servo motor 708, a second servo motor 714, a belt driven linear actuator 804, a magnetometer 312, and a microprocessor 304, said microprocessor 304 executes all functions in said semi-automatic painting robot 106, wherein said microprocessor 304 comprises
  a co-ordinates obtaining module 402 that is configured to receive co-ordinates of said paintable area and said non-paintable area from said user device 104;
  a navigation module 404 that is configured to navigate said semi-automatic painting robot 106 to a start point near said interior wall through user interactions on said user device 104;

a distance determination module 406 that is configured to measure a distance between said semi-automatic painting robot 106 and said interior wall;

an orientation module 408 that is configured to align said semi-automatic painting robot 106 parallel to said interior wall based on said distance between said semi-automatic painting robot 106 and said interior wall;

a first paint stroke module 412 that is configured to apply a first paint stroke by (i) accelerating said belt driven linear actuator 804 from a first stroke start point 902A of said belt driven linear actuator 804 to a first stroke initial point 904A of said paintable area, (ii) maintaining constant velocity of said belt driven linear actuator 804 from said first stroke initial point 904A of said paintable area to a first stroke final point 906A of said paintable area, and (iii) decelerating said belt driven linear actuator 804 from said first stroke final point 906A of said paintable area to a first stroke end point 908A of said belt driven linear actuator 804;

an overlap navigation module 414 that is configured to automatically navigate said semi-automatic painting robot 106 by half of a fan width of said spray gun 710 parallel to said interior wall for applying a second paint stroke by overlapping a half of said first paint stroke when said semi-automatic painting robot 106 completes first paint stroke;

a second paint stroke module 416 that is configured to apply said second paint stroke by (i) accelerating said belt driven linear actuator 804 from an second stroke end point 908B of said belt driven linear actuator 804 to a second stroke final point 906B of said paintable area, (ii) maintaining constant velocity of said belt driven linear actuator 804 from said second stroke final point 906B of said paintable area to a second stroke initial point 904B of said paintable area, and (iii) decelerating said belt driven linear actuator 804 from said second stroke initial point 904B of said paintable area to a second stroke start point 902B of said belt driven linear actuator 804;

a trigger control module 418 that is configured to activate said first servo motor 708 that triggers said spray gun 710, mounted on said belt driven linear actuator 804, to paint said interior wall while painting said paintable area;

a magnetic field sensor module 420 that is configured to measure magnetic field orientation readings of said semi-automatic painting robot 106 with respect to earth's magnetic field; and a re-alignment module 422 that is configured to re-align said semi-automatic painting robot 106 in corner areas of said interior wall by a predefined angle of 45 degree and/or 90 degree based on said magnetic field orientation readings of said semi-automatic painting robot 106.

2. The system as claimed in claim 1, wherein said device processor comprises an image stitching module 206 that is configured to stitch more than one images of said interior wall to obtain a combined image when said image capturing module 204 captures one or more than one images of said interior wall.

3. The system as claimed in claim 1, wherein said microprocessor 304 comprises an area division module 410 that is configured to virtually divide said interior wall in terms of width of said spray gun 710, that are adapted to determine number of paint strokes to be applied on said interior wall by said semi-automatic painting robot 106.

4. The system as claimed in claim 1, wherein said semi-automatic painting robot 106 comprises a servo drive module 306 that monitors a servo motor and encoder module 308, wherein said servo motor and encoder motor 308 is configured to guide said spray gun 710 to apply said first paint stroke and said second paint stroke based on signals from said microprocessor 304.

5. The system as claimed in claim 1, wherein said semi-automatic painting robot 106 comprises a DC motor drive module 316 that monitors DC motor and encoder module 314, wherein said DC motor and encoder module 314 is configured for locomotion/navigation of said semi-automatic painting robot 106 based on signals from said microprocessor 304.

6. One or more non-transitory computer readable storage mediums storing one or more sequences of instructions, which when executed by one or more processors, performs a method of painting an interior wall using a semi-automatic painting robot 106, said method comprising steps of:

capturing one or more than one images of an interior wall to be painted with a colored paper pasted on said interior wall using a camera of a user device 104;

stitching said more than one images of said interior wall in an order to obtain a combined image of said interior wall;

cropping said combined image to obtain a cropped image and affine transformation of said cropped image;

converting pixels of said cropped image into co-ordinates of said interior wall;

demarcating between a paintable area and a non-paintable area on said interior wall based on inputs obtained through user interactions on said user device;

communicating said paintable area and said non-paintable area for painting said interior wall in the form of co-ordinates of said interior wall;

navigating a semi-automatic painting robot 106 to a start point near said interior wall based on inputs obtained through user interactions on said user device 104;

aligning said semi-automatic painting robot 106 parallel to said interior wall at a fixed distance based on a distance measured between said semi-automatic painting robot 106 and said interior wall;

applying a first paint stroke in a vertical manner from bottom to top in a constant velocity on said interior wall;

re-aligning said semi-automatic painting robot 106 laterally on ground by half of a fan width of said spray gun 710 for applying a second paint stroke; and applying said second paint stroke in said constant velocity by overlapping half of said first paint stroke from top to bottom in said vertical manner.

7. The one or more non-transitory computer readable storage mediums storing one or more sequences of instructions of claim 6, wherein said semi-automatic painting robot 106 paints said paintable area on said interior wall using one or more paint strokes based on inputs of a user 102 through user interactions on a user interface on said user device 104.

8. The one or more non-transitory computer readable storage mediums storing one or more sequences of instructions of claim 6, wherein said colored paper acts as a reference for (i) measuring height and length of said interior wall, and (ii) identifying co-ordinates of said non-paintable area.

9. The one or more non-transitory computer readable storage mediums storing one or more sequences of instructions of claim 6, wherein said constant velocity in applying said first paint stroke and said second paint stroke is maintained by said second servo motor 714 while painting said paintable area to avoid paint dripping and to ensure optimum wall finish of said interior wall.

10. The one or more non-transitory computer readable storage mediums storing one or more sequences of instructions of claim 6, wherein said semi-automatic painting robot 106 is navigated to corner areas of said interior wall to paint said corner areas of said interior wall based on user inputs through user interactions on said user device 104.

* * * * *